No. 641,747. Patented Jan. 23, 1900.
F. A. WORLEY.
ANIMAL YOKE OR POKE.
(Application filed Oct. 11, 1898.)

(No Model.)

Witnesses

Inventor
F. A. Worley,

UNITED STATES PATENT OFFICE.

FRANK ATHAR WORLEY, OF BOWIE, TEXAS.

ANIMAL YOKE OR POKE.

SPECIFICATION forming part of Letters Patent No. 641,747, dated January 23, 1900.

Application filed October 11, 1898. Serial No. 693,223. (No model.)

*To all whom it may concern:*

Be it known that I, FRANK ATHAR WORLEY, a citizen of the United States, residing at Bowie, in the county of Montague and State of Texas, have invented a new and useful Animal Yoke or Poke, of which the following is a specification.

This invention relates generally to an animal yoke or poke, and more particularly to one capable of being attached to an ordinary halter, the object being to provide an exceedingly cheap and simple device which can be attached to the halter and the horse permitted to run loose in the field, the purpose of the yoke or poke being to prevent the animal jumping a fence.

Another object of the invention is to so construct the said yoke or poke as to prevent the horse throwing the yoke or poke over the fence preparatory to going over.

With these objects in view the invention consists, essentially, of a pendent yoke or poke, provided with forwardly-projecting teeth, connected at its lower end to the halter by means of a chain, whereby the animal is prevented from tossing the lower end of the yoke forwardly and upwardly.

The invention consists also in certain details of construction and novelties of combination, all of which will be fully described hereinafter, and pointed out in the claims.

Figure 1:
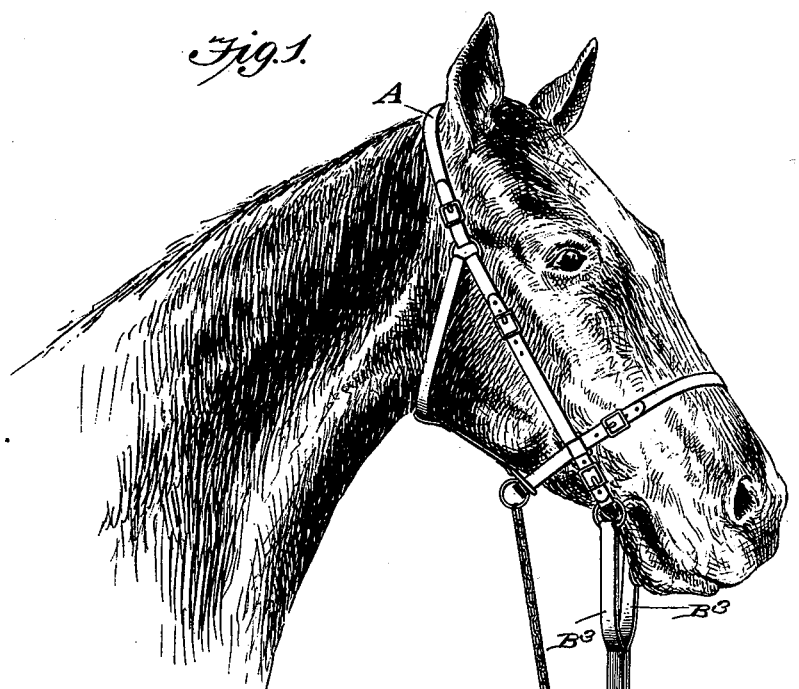
Figure 1:
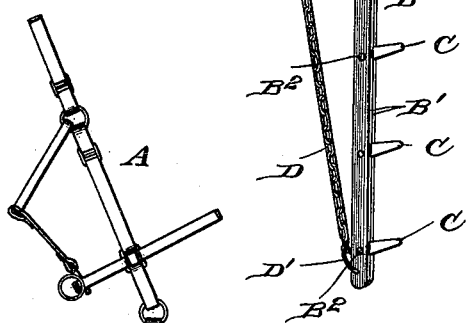
Figure 2:
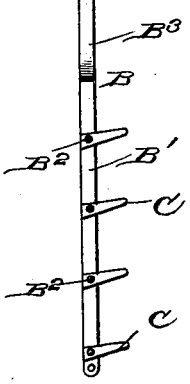

In the drawings forming part of this specification, Figure 1 is a view showing the practical application of my invention; and Fig. 2 is a side elevation of the device, the chain being removed.

In the practical embodiment of my invention I employ a halter A, which may be substantially the same as the halters now in general use, and connected to the cheek-straps of said halter is the pendent yoke or poke B, composed of two strips or pieces B', secured together by rivets $B^2$ to a point near their upper ends, where each strip is then bent outwardly, as shown at $B^3$, in order to form a yoke proper and enable the device to be connected to the cheek-straps at each side of the bridle or halter. The forwardly-projecting teeth C are secured between the strips B' by means of the rivets $B^2$, and these forwardly-projecting teeth are adapted to catch in the rails or strands of the fence and prevent the animal jumping, and the chain D is attached to the under side of the nose-strap and connects at its lower end to a ring D', attached to the lower end of the depending poke. This chain D prevents the animal tossing the poke or yoke upwardly for the purpose of throwing it over the fence, as an animal soon learns to do unless restrained in some manner, and it will be noted that the chain and teeth prevent any such movement by the animal, but will not restrain him in any movements except jumping a fence.

Having thus fully described my invention, what I claim as new, and desire to secure by Letters Patent of the United States, is—

1. A device of the kind described, comprising a bridle or halter having a depending yoke or poke attached to the cheek-straps thereof and provided with forwardly-projecting teeth and the chain or straps connecting the lower edge of said yoke or poke with the halter or bridle in rear of the connection of the poke therewith, whereby an upward or forward movement of the poke is prevented, substantially as described.

2. A depending yoke or poke, composed of two pieces riveted together and having a forwardly-projecting tooth secured at each rivet, the upper ends of said pieces being curved and supported for the purpose of attachment to the bridle or halter and the chain connected to the lower end of the straps and adapted to be connected to the bridle or halter at its upper end in rear of the connection of the poke therewith, substantially as described.

FRANK ATHAR WORLEY.

Witnesses:
G. F. THOMAS,
JNO. B. C. WORLEY.